(12) United States Patent
Hostetler

(10) Patent No.: US 6,350,328 B1
(45) Date of Patent: Feb. 26, 2002

(54) METAL INJECTION MOLDING

(75) Inventor: David W. Hostetler, Walkerton, IN (US)

(73) Assignee: Rossborough Manufacturing Co. LP, Avon Lake, OH (US)

( * ) Notice: Subject to any disclaimer, the term of this patent is extended or adjusted under 35 U.S.C. 154(b) by 0 days.

(21) Appl. No.: 09/605,169

(22) Filed: Jun. 27, 2000

(51) Int. Cl.[7] .................................................. C22F 1/00
(52) U.S. Cl. ........................ 148/559; 148/667; 164/900; 72/364
(58) Field of Search .................... 164/900; 148/667, 148/559; 72/364

(56) References Cited

U.S. PATENT DOCUMENTS 6,120,625 A * 9/2000 Zhou et al. .................. 148/690

* cited by examiner

*Primary Examiner*—Roy King
*Assistant Examiner*—Janelle Combs-Morillo
(74) *Attorney, Agent, or Firm*—Vickers, Daniels & Young

(57) ABSTRACT

Feed material for use in producing a thixotropic alloy comprising pellets in the form of a solid cylinder having a length to diameter ratio in the range of from 1:1 to 2:1 and a maximum length of 0.250 inch.

25 Claims, 7 Drawing Sheets

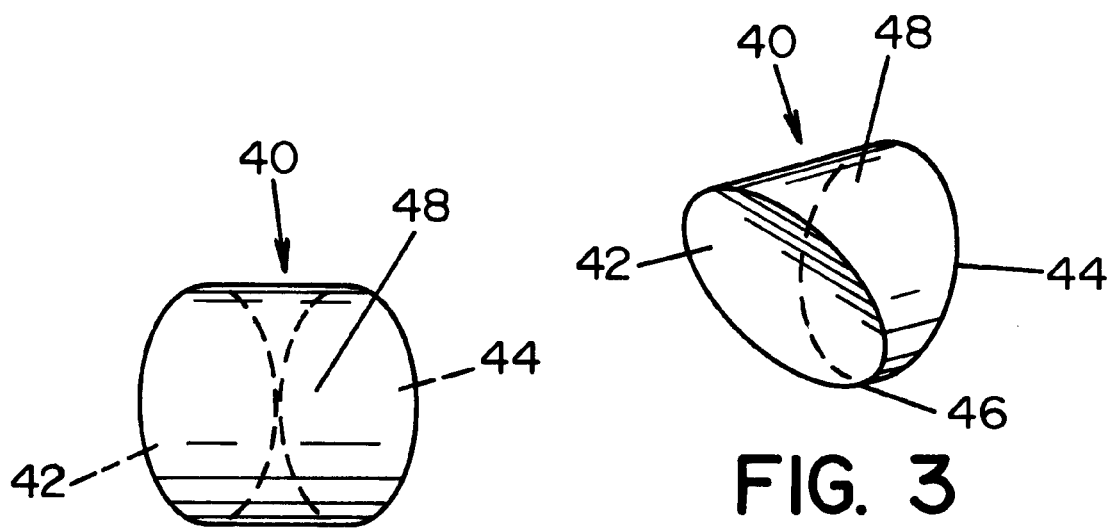
FIG. 3
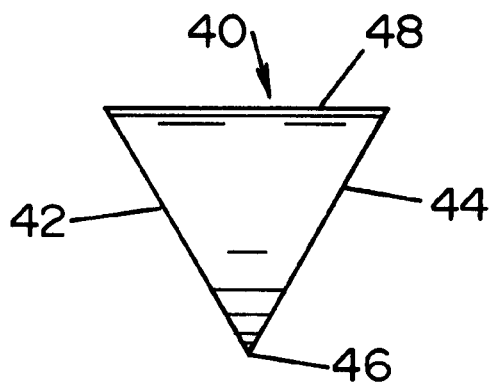
FIG. 4
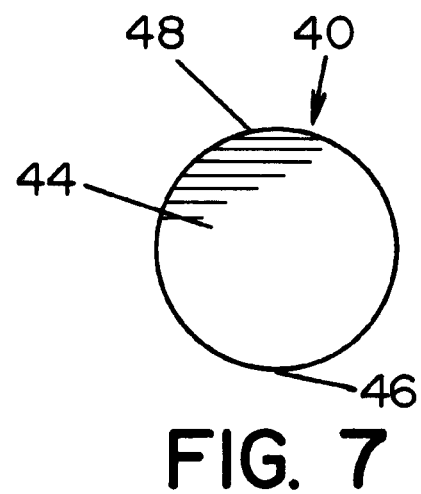
FIG. 7
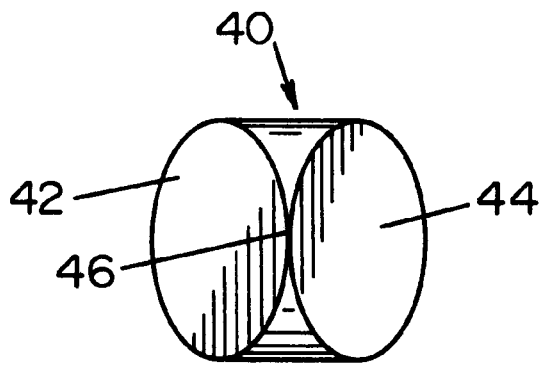
FIG. 5
FIG. 6

METAL INJECTION MOLDING

This invention relates to the art of injection molding or casting of thixotropic alloys and, particularly, to an improved structure of an alloy or composite feed material for use in producing a thixotropic alloy, and a method of producing the feed material, and more particularly to a feed material and method for producing a feed material for use in forming a thixotropic alloy.

BACKGROUND OF THE INVENTION

It is known, as disclosed for example in U.S. Pat. No. 4,694,881 to Busk, U.S. Pat. No. 4,694,882 to Busk and U.S. Pat. No. 5,040,589 to Bradley, the disclosures of which are hereby incorporated herein by reference for background purposes, thixotropic alloys can be produced by processing solid particles of a metal alloy in an extruder, such as a screw extruder. In the earlier of the Busk patents, the solid particles are heated to a temperature above the liquidus temperature of the alloy, and the resulting molten mass is subsequently cooled to a temperature between the solidus and liquidus temperatures and subjected to shearing to break the dendritic structure formed during solidification. The resulting liquid-solid mixture of a thixotropic alloy is injected into a mold to form a molded product. In the more recent Busk patent, and in the patent to Bradley, the particles of feed material are heated to a temperature between a solidus and liquidus temperatures, whereby complete melting of the feed material does not take place.

In both of the Busk patents, the feed material is disclosed as being particles or chips of a metal alloy which are described as being of a convenient size for handling and as having an irregular, non-uniform shape, and the patents refer to the material being ground to a 50 mesh size. The Bradley patent refers to pellets, chips or powder, but not to a size therefor and, as disclosed in U.S. Pat. No. 5,577,546 to Kjar, et al., the disclosure of which is hereby incorporated herein by reference for background purposes, the particulate feed material for use in the foregoing processes are particles shaped such that the ratio of the length of the largest dimension to the effective diameter of the particle is in the range of 1.0 to 4.0 and, most preferably, 1.2 to 2.0 with a maximum dimension in the range of 0.5 to 5.0 and, preferably, in the range of 1.0 to 3.0 millimeters. The particles in Kjar, et al. preferably have an ovoid shape or a teardrop shape. In any event, irregular shaped chips such as those referred to in the Busk patents are prone to clog the feed hopper and seize the screw extruder in which the particles are processed to produce a thixotropic alloy. Moreover, irregular particle profiles do not exhibit good packing characteristics relative to one another and this can result in difficulty in achieving adequate heat transfer rates to cause the partial melting of the metal particles and can make it difficult to control the process temperature. While spherical particles provide an optimum particle profile for minimizing the foregoing problems, the cost of producing spherical particles is unacceptably high, and the process for producing such particles can be dangerous. Similarly, the ovoid or teardrop shaped particles described in Kjar, while providing somewhat less efficient packing, feeding and heat transfer characteristics, compared to spherical particles, also have unacceptably high production costs, and require a possibly dangerous production process.

SUMMARY OF THE INVENTION

In accordance with the principal aspect of the present invention, a particle structure or profile for feed material used in producing a thixotropic alloy is provided which minimizes or overcomes the foregoing problems encountered in connection with the particulate feed material heretofore available. Accordingly, the feed material particles of the present invention have a substantially uniform particle contour or profile which provides several advantages over past types of thixotropic alloy configurations. The uniform particle contour or profile of the feed material particles avoids a particle contour or profile with irregular or undesired shapes on the particles which can interfere with achieving good packing of the particular material and which can cause jamming or seizing of the screw extruder. The uniform particle contour or profile of the feed material particles also facilitates in obtaining a desired heat transfer rate and a desired control of the process temperature when forming the thixotropic alloy.

In one particular aspect of the present invention, the feed material particles are solid cylinders having end faces that are substantially perpendicular to the axis of the cylinder. The cylindrical configuration advantageously provides a uniform particle contour or profile. The cylindrical design has a particle contour or profile which achieves good packing of the particular material and avoids jamming or seizing of the particle mover. The cylindrical design also facilitates improved heat transfer rates and desired control of the process temperature when forming the thixotropic alloy. The solid cylindrical particles can be readily produced by continuously extruding one or more columns of the metal alloy or composite with the rate of movement of the column or columns coordinated with the speed of a cutting device so that the particles are of substantially uniform length and configuration. Typically, the cylindrical thixotropic alloy particles have a length to diameter ratio of about 0.8:1 to about 4:1 and, preferably about 1:1 to about 2.5:1, and more preferably about 1.5:1 to about 2:1. The maximum length of the cylinder is generally less than about 1.0 inch, preferably about 0.1 to about 0.5 inch, and more preferably about 0.15 to about 0.25 inch. Furthermore, the maximum diameter of the cylinder is generally less than about 0.75 inch, preferably about 0.05 to about 0.4 inch, and more preferably about 0.075 to about 0.125 inch.

In accordance with another aspect of the present invention, the particles are formed from a cylindrical extrusion which has been cut so that at least one end face of the particles is oblique to the axis of the particle. This modified cylindrical configuration also advantageously provides a uniform particle contour or profile. This modified cylindrical design also has a particle contour or profile which excludes flattened or pointed portions of the longitudinal outer surface of the particle thereby achieving good packing of the particular material and/or avoiding jamming or seizing of the a particle mover. This modified cylindrical design further facilitates improved heat transfer rates and desired control of the process temperature when forming the thixotropic alloy. The solid modified cylindrical particles can be readily produced by continuously extruding one or more columns of the metal alloy or composite with the rate of movement of the column or columns coordinated with the speed of a cutting device so that the particles are of substantially uniform length and configuration. In one embodiment, one end of the particle is substantially perpendicular to the axis of the particle and the other end is not perpendicular to the axis of the particle. In one aspect of this embodiment, the end that is not perpendicular to the axis of the particle is substantially uniformly sloped. The angle of slope is typically between about 5–75°, and preferably about 30–60°. In another embodiment, both ends of the particle are not perpendicular to the axis of the particle. In one aspect of this embodiment, the two ends of the particle slope toward one another. In one design, the two ends have angles of slope which are substantially equal. In this design, the side profile of the particle has an isosceles triangle shape. In another design, the side profile of the particle is trapezoidal. In still another design, the side profile of the particle is substantially triangular and the two ends have an angle of slope which is different. In still another design, a portion of the two ends merge at least at one surface of the particle. In still yet another design, the ends are substantially uniformly sloped. The angle of slope is typically between about 5–75°, and preferably about 30–60°. In still another embodiment, at least one end has a sloped portion and a portion that is substantially perpendicular to the axis of the particle. In still yet another embodiment, the particles have a maximum length to maximum diameter ratio of about 0.8:1 to about 4:1 and, preferably about 1:1 to about 2.5:1, and more preferably about 1.5:1 to about 2:1. The maximum length of the cylinder is generally less than about 1.0 inch, preferably about 0.1 to about 0.5 inch, and more preferably about 0.15 to about 0.25 inch. Furthermore, the maximum diameter of the cylinder is generally less than about 0.75 inch, preferably about 0.05 to about 0.4 inch, and more preferably about 0.075 to about 0.125 inch.

In accordance with yet another aspect of the present invention, the particles are formed from a substantially cylindrical shaped extrusion of metal which has been cut to form the substantially uniformly shaped particles. During the cutting process, one or more substantially cylindrical shaped extrusions of metal can be directed to the cutter. In one embodiment, the substantially cylindrical shaped extrusion of metal is fed through a shear cutting wheel which shears the cylindrical shaped extrusion as the shear wheel rotates while the extrusion is fed through one or more openings in the shear wheel. In another embodiment, the substantially cylindrical shaped extrusion of metal is fed to a shearing ledge to be shear cut by a blade. In another embodiment, the substantially cylindrical shaped extrusion of metal is fed to a cutter that has one or more teeth used to periodically cut the extrusion as the extrusion passes through the cutter.

In accordance with still yet another aspect of the present invention, the thixotropic alloy can be produced using feed material according to the present invention by heating and shearing the feed material, such as in a screw extruder, to produce a mixture of solid particles within a liquid metal, and an article of manufacture can be provided by injecting this mixture into an article mold and at least partially solidifying the mixture in the mold prior to removing the article from the mold. The feed material of the present invention may be of any desired metal alloy or composite thereof such as, for example, metals and alloys based on lead, aluminum, zinc, magnesium, copper, and iron with the preferred material being alloys of magnesium.

It is accordingly a principal object of the present invention to provide an improved feed material for use in producing a thixotropic alloy.

Another object of the present invention is the provision of a feed material for the foregoing purpose having a solid feed material which a profile to minimize blockage and/or seizure of a particle transport mechanism.

Yet another object of the present invention is the provision of a feed material having improved packing characteristics.

Still another object of the present invention is the provision of a feed material having improved heat transfer and control characteristics which promotes the formation of a thixotropic alloy.

Still yet another object of the present invention is the provision of a feed material having an essentially circular cross-sectional shape.

A further object of the present invention is the provision of a feed material having a substantially uniform shape.

Yet a further object of the present invention is the provision of a feed material having a substantially cylindrical shape.

Still a further object of the present invention is the provision of a feed material having an isosceles shaped side profile and a substantially circular cross sectional shape.

Still yet a further object of the present invention is the provision of a feed material having a trapezoidal side profile and a substantially circular cross sectional shape.

Another object of the present invention is the provision of a feed material having a triangular side profile and a substantially circular cross-sectional shape.

Another object of the present invention is the provision of a method of producing feed material for the foregoing purpose.

Still another object of the present invention is the provision of a method for producing a thixotropic alloy using feed material according to the present invention.

Yet another object of the present invention is the provision of a method of producing an article of manufacture using feed material in accordance with the present invention.

These and other objects and advantages will become apparent to those skilled in the art upon the reading and following of this description taken together with the accompanied drawings.

BRIEF DESCRIPTION OF THE DRAWINGS

Reference may now be made to the drawings, which illustrate various embodiments that the invention may take in physical form and in certain parts and arrangements of parts wherein:

FIG. 3 is a perspective view of an alternative embodiment of the pellet of feed material in accordance with the invention;

FIG. 4 is a top plan view of the pellet of feed material of FIG. 3;

FIG. 5 is a side view of the pellet of feed material of FIG. 3;

FIG. 6 is a bottom plan view of the pellet of feed material of FIG. 3;

FIG. 7 is an end view of the pellet of feed material of FIG. 3;

DESCRIPTION OF THE PREFERRED EMBODIMENTS

Figure 1:
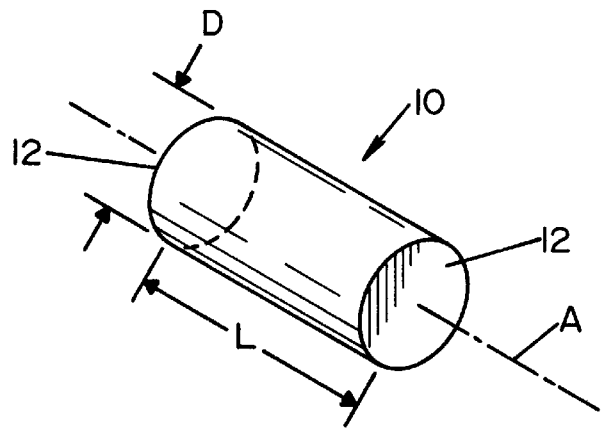
FIG. 1 is a perspective view of a cylindrical pellet of feed material in accordance with the invention.

Referring now to the drawings wherein the showings are for the purpose of illustrating a preferred embodiment of the invention only and not for the purpose of limiting the invention, FIG. 1 illustrates a pellet 10, preferably of magnesium or a magnesium alloy, which is in the form of a solid cylinder having an axis A, a diameter D, and a length L between planar end faces 12 which are perpendicular to axis A. The length to diameter ratio of pellet 10 is in the range of about 1:1 to about 2:1 with a maximum length of about 0.250 inch. Typically, the length to diameter ratio of pellet 10 is about 2:1 with a length of about 0.250 inch and a diameter of about 0.125 inch.

It will be appreciated that the cylindrical outer surface of pellet 10 and the circular contour of the intersection thereof with planar end faces 12 provides edges and surfaces which exclude narrow portions which would have a tendency to enter the space between the screw and jacket of an extruder so as to cause jamming or seizing of the screw. The cylindrical edges and surface contours promote a rolling motion of the pellet relative to the screw and jacket and, therefore, promote continuous operation of the extruder during the formation of the pellets. Moreover, it will be appreciated that the uniform size and shape of the pellets relative to one another promote a consistent packing characteristic. The uniform size and shape of the pellets also promote easier and better transport of the pellets for delivery. The uniform size and shape of the pellets further promote good and consistent heat transfer rates, and easier temperature control of the solid and molten pellets when operating the screw extruder to produce a thixotropic alloy. Accordingly, good control of the process temperature is obtained.

Figure 2:
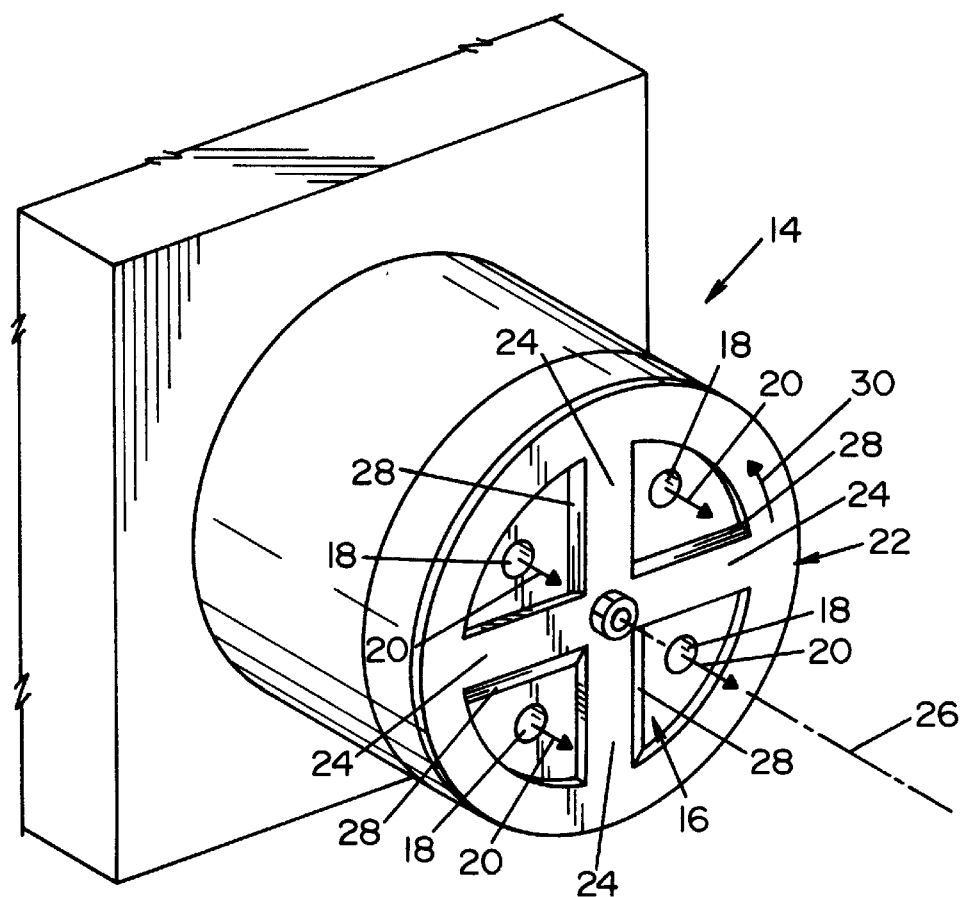
FIG. 2 is a perspective view schematically illustrating the discharge end of an extruder and a cutter thereon for producing pellets of feed material of FIG. 2.
Figure 8:
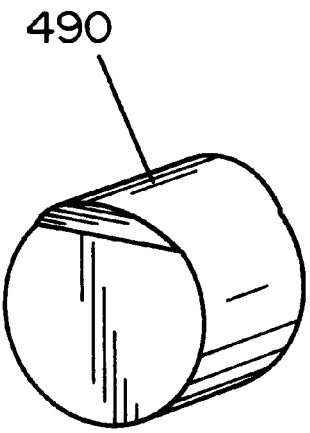
FIG. 8 is a perspective view of another alternative embodiment of the pellet of feed material in accordance with the invention.

Advantageously, and as schematically illustrated in FIG. 2, pellets can be quickly and continuously produced through the use of extruding apparatus having a discharge end 14 including a discharge plate 16 provided with a plurality of discharge openings 18 therethrough and through which the metal or metal alloy of the pellets is continuously advanced forwardly of discharge plate 16 as represented by arrows 20. It will be appreciated, of course, that the pellet stock material is heated in the extruder to its extrusion temperature and then extruded through an adaptor having openings 18. A cutting wheel 22 having cutting blades 24 corresponding in number to the number of openings 18 is supported on the discharge plate for rotation about axis 26. Each of the cutting blades 24 is provided with a cutting edge 28, whereby rotation of cutting wheel 22 counterclockwise in the direction of arrow 30 in FIG. 2 results in the simultaneous severing of pellets 10 on the continuously moving columns of metal or alloy. It will be appreciated, that the rate of movement of the columns in the direction of arrows 20 is coordinated with the speed of rotation of cutting wheel 22 so as to achieve the desired length for the pellets relative to the diameter thereof which is fixed by the diameters of openings 18. While FIG. 2 illustrates four openings 18 for the extrusion of columns of the pellet material, it will be appreciated that more or less than four openings could be provided and that the cutting wheel would be modified to provide a corresponding number of cutting blades.

Figure 14:
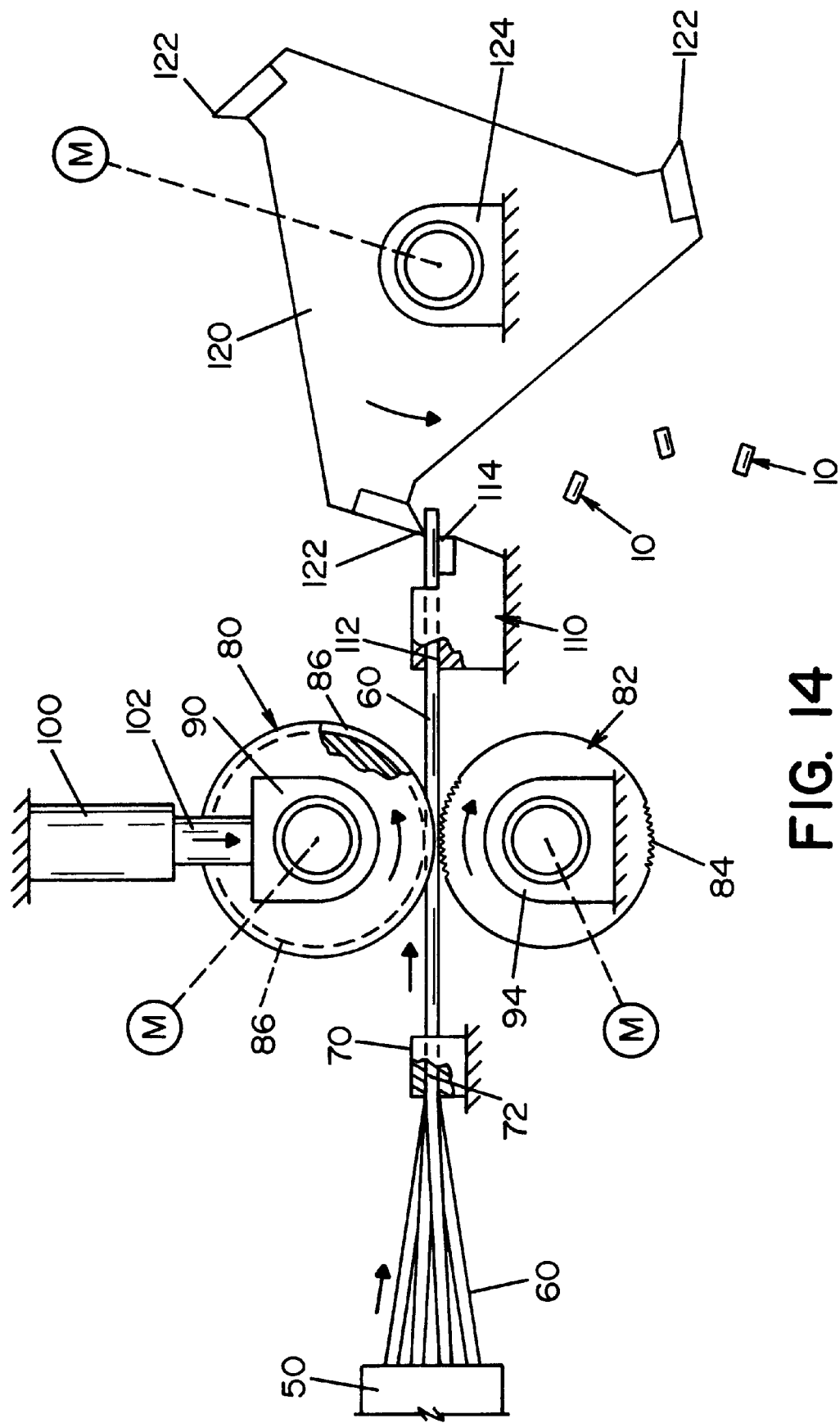
FIG. 14 is a side view schematically illustrating another extruder and a cutter for producing pellets of feed material of FIGS. 2.
Figure 15:
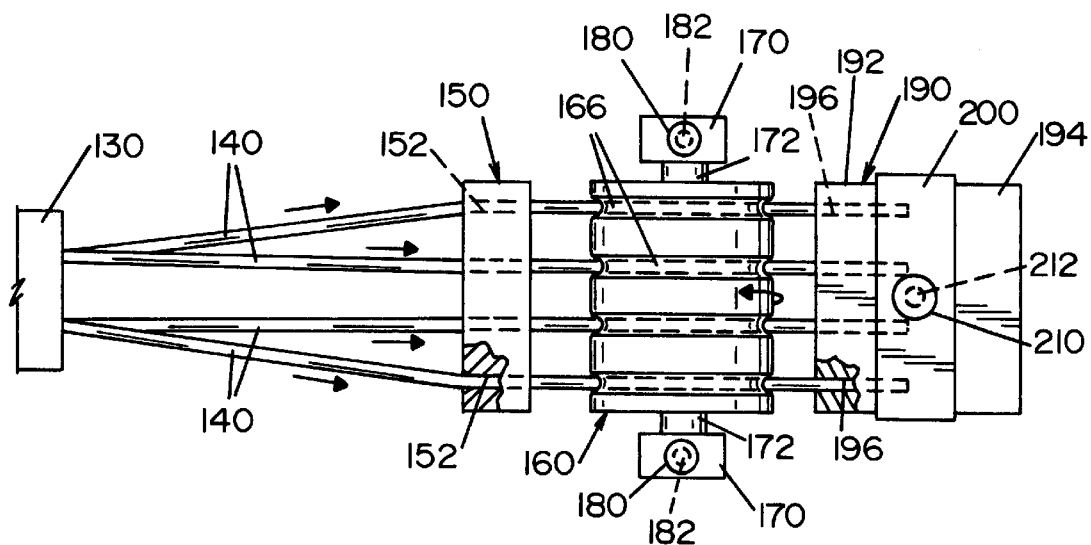
FIG. 15 is a top plan view schematically illustrating still another extruder and a cutter for producing pellets of feed material of FIGS. 3 and 8.
Figure 16:
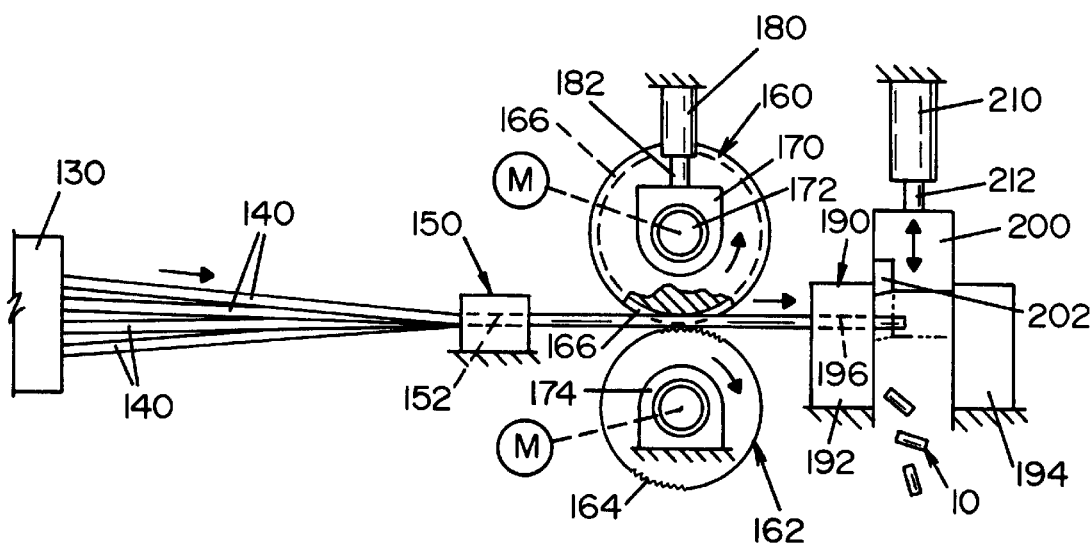
FIG. 16 is a side view schematically illustrating the extruder and a cutter of FIG. 15.

Referring now to FIGS. 14–16, two alternative apparatuses are shown to produce cylindrically shaped pellets. Referring now to FIG. 14, a plurality of cylindrically shaped metal columns 60 are extruded through a plurality of openings in extruder 50. Typically, 4–12 columns of metal are extruded by the extruder; however, more or less columns can be extruded. The size of the openings in extruder 50 determine the cross-sectional diameter of the metal columns. As can be appreciated, a variety of different opening sizes can be selected for use with the extruder. The plurality of metal columns 60 are directed through a plurality of openings 72 in column guide 70. Column guide 70 orients the metal columns 60 in substantially the same plane. The metal columns are then drawn through a feeder. The feeder draws the columns of metal 60 from extruder 50 and directs the metal columns to a cutting platform 110. The feeder includes two drive wheels 80, 82 which are rotated at a substantially constant speed by motors M. The drive wheels are shown to be substantially the same size, thus they rotate at substantially the same speed. As can be appreciated, the drive wheels can be different sizes, thus rotating at differing speeds. Drive wheel 82 is rotatably mounted on axle base 94. Axle base 94 is illustrated as being mounted in place thereby maintaining drive wheel 82 is a substantially constant position. Drive wheel 82 includes a plurality of teeth 84 that are designed to engage and draw metal columns 60 through drive wheels 80, 82 as the drive wheels are rotated in the direction of the arrows. Drive wheel 80 is also shown to be rotatably mounted to an axle base 90. The axle base 90 is mounted to a movable piston 102 which is connected to a piston column 100. Movable piston 102 causes drive wheel 80 to be driven downwardly toward drive wheel 82 thereby producing the needed friction between the drive wheels so that columns 60 are drawn through the drive wheels. Piston 102 is typically forced downwardly by air pressure and/or by a spring. Drive wheel 80 includes guide groove 86. Each guide groove is designed to receive a single metal column of extruded metal. After the metal columns 60 are drawn through drive wheels 80, 82, the columns of metal are directed into openings 112 in cutting platform 110. Openings 112 facilitate in holding down the metal columns as the ends of the columns are cut. Cutting platform 110 includes a cutting ledge 114 where a rotating blade 120 supported by axle base 124 cuts the column of metal to a desired length to form pellets 10. Rotating blade 120 includes three cutting tools 122 which shear cut the metal columns. As can be appreciated, more or less cutting tools 122 can be used on the rotating blade. Rotating blade 120 is rotated by a motor in a direction as shown by the arrow. The motor rotates blade 120 at a substantially constant speed so that pellets 10 are substantially the same length. The speed of rotation of blade 120 in combination with the speed at which the metal columns are driven toward cutting platform 110 by drive wheels 80, 82 determines the length of pellets 10. It will be appreciated, that the pellet stock material can be heated in the extruder to its extrusion temperature and then extruded through the openings in extruder 50. It will also be appreciated, that the columns of metal can be heated or cooled when being passed through guide 70, drive wheels 80, 82 and/or cutting platform 110.

Referring now to FIGS. 15 and 16, an alternative cutting apparatus is shown. The cutting apparatus of FIGS. 15 and 16 is a modification of the cutting apparatus of FIG. 14. As shown in FIGS. 15 and 16, a plurality of cylindrically shaped metal columns 140 are extruded through a plurality of openings in extruder 130. The size of the openings in extruder 130 determines the cross-sectional diameter of the metal columns. A variety of different opening sizes can be use. The plurality of metal columns 140 are directed through a plurality of openings 152 in column guide 150. Column guide 150 orients metal columns 140 in substantially the same plane as shown in FIG. 16. The metal columns are then drawn through a feeder. The feeder includes two drive wheels 160, 162 which rotate at a substantially constant speed in the direction shown by the arrows. The drive wheels are illustrated as being substantially the same size, thus they rotate at substantially the same speed. Drive wheel 162 is rotatably mounted on axle base 174. Axle base 174 is mounted in place thereby maintaining drive wheel 162 is a substantially constant position. Drive wheel 162 includes a plurality of teeth 164 that are designed to engage and draw metal columns 140 through drive wheels 160, 162. Drive wheel 160 is rotatably mounted on axle 172 of axle base 170. The axle base 170 is mounted to a movable piston 182 which is connected to a piston column 180. Movable piston 182 causes drive wheel 160 to be driven downwardly toward drive wheel 162 thereby producing the needed friction between the drive wheels so that columns 140 are drawn through the drive wheels. Piston 182 is typically forced downwardly by air pressure and/or by a spring. Drive wheel 160 includes guide groove 166. Each guide groove is designed to receive a single metal column of extruded metal. After the metal columns 140 are drawn through drive wheels 160, 162, the columns of metal are directed into openings 196 of cutting platform 190. Openings 196 facilitate in holding down the metal columns as the ends of the columns are cut. Cutting platform 190 includes two blade guide walls 192, 194 which are rigidly mounted in position. A downwardly moving shearing blade 200 is sized to slide between blade guide walls 192, 194. Shearing blade 200 is connected to blade piston 212 which is telescopically received in piston housing 210. Blade piston 212 moves shearing blade 200 upwardly and downwardly as indicated by the arrows to shear portions of the metal columns 140 to form pellets 10. Typically, blade piston 212 is operated by air pressure. Shear blade 200 includes a cutting tool 202. Cutting tool 202 allows cutting blade 200 to partially be inserted between blade guide walls 192, 194 before shearing a portion of metal columns 140. The partial positioning of shear blade 200 between the blade guide walls prevents the shear blade from moving horizontally when cutting the metal columns thereby producing a cleaner cut. The speed at which the shear blade moves upwardly and downwardly in combination with the speed at which the metal columns are driven toward cutting platform 190 by drive wheels 160, 162 determines the length of pellets 10. It will be appreciated, that the pellet stock material can be heated in the extruder to its extrusion temperature and then extruded through the openings in the extruder. It will also be appreciated, that the columns of metal can be heated or cooled when being passed through guide 150 drive wheels 160, 162 and/or cutting platform 190.

Referring now to FIGS. 3–7, an alternative pellet design is shown. Pellet 40 is a solid modified cylinder having planar end faces 42, 44 which are not perpendicular to the longitudinal axis of the pellet. As shown in FIG. 7, the cross-sectional shape of the pellet is circular along the longitudinal axis of the pellet. As shown in FIG. 5, the side profile of the pellet is triangular, formed by sloping sides 42, 44 and base side 48. The angles of slope of the two sloping sides are substantially the same. The two sloped planar end faces converge at point 46 the outer peripheral side of the pellet. The maximum length to maximum diameter ratio of pellet 40 is in the range of about 1:1 to about 2:1 with a maximum length base side 48 of about 0.250 inch. Typically, the length to diameter ratio of pellet 40 is about 2:1 with a length of about 0.250 inch and a diameter of about 0.125 inch.

Figure 9:
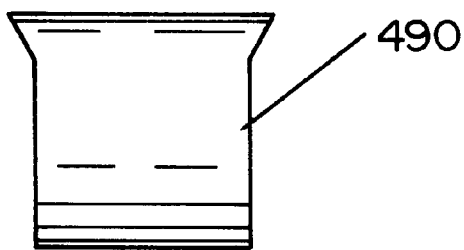
FIG. 9 is a side view of the pellet of feed material of FIG. 8.
Figure 11:
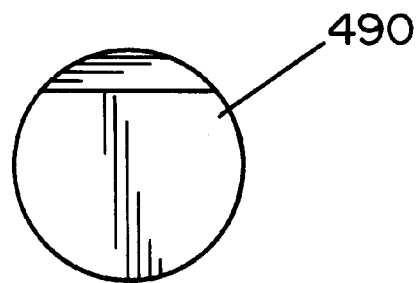
FIG. 11 is an end view of the pellet of feed material of FIG. 8.
Figure 10:
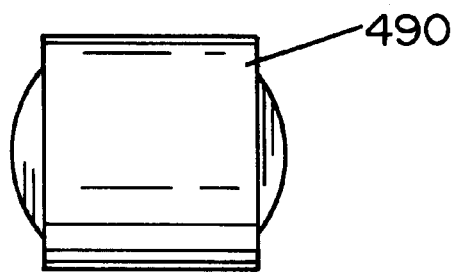
FIG. 10 is a bottom plan view of the pellet of feed material of FIG. 8.
Figure 13:
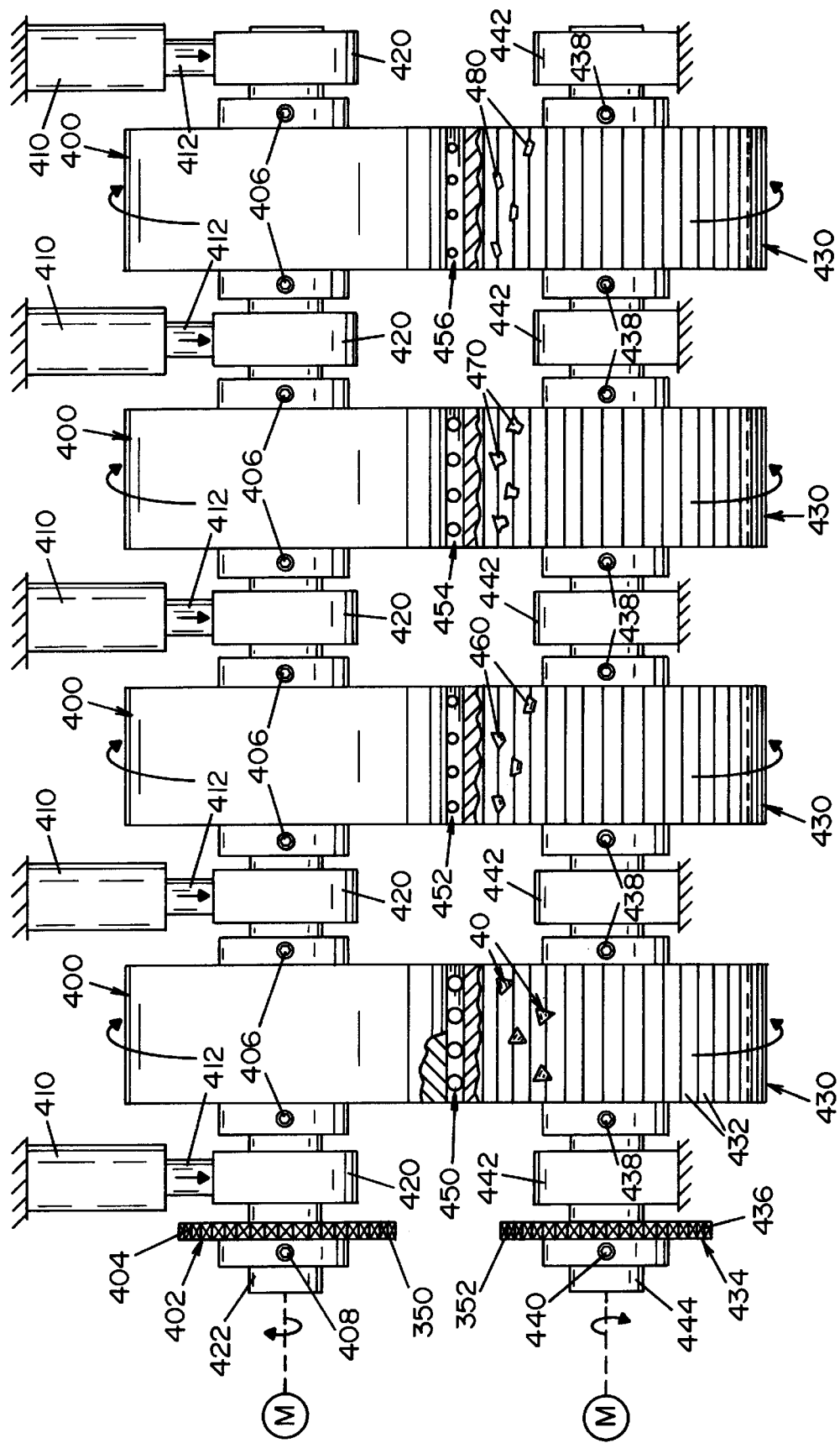
FIG. 13 is a end view taken along line 13—13 of FIG. 12 schematically illustrating a plurality of extruders and cutters of FIG. 12.

As can be appreciated, the modified pellet can be formed such that the two sloping sides do not converge. In such a pellet design, the side profile of the pellet would be trapezoidal or semi-trapezoidal. These shaped pellets 460, 470, 480 are illustrated in FIG. 13. In addition, the pellets can have another profile as shown in FIGS. 8–11. FIG. 9 illustrates a side profile of pellet 490 which has an initial sloped side profile similar to pellet 40 shown in FIG. 5, yet the remainder of the side profile is substantially perpendicular to the axis of pellet 40. This side profile is a semi-trapezoidal profile. This pellet is formed in a similar manner as the pellets of FIGS. 3–7 except that part of the way through the cutting of the extruded metal, the metal shears to form a face substantially perpendicular to the axis of the pellet.

Figure 12:
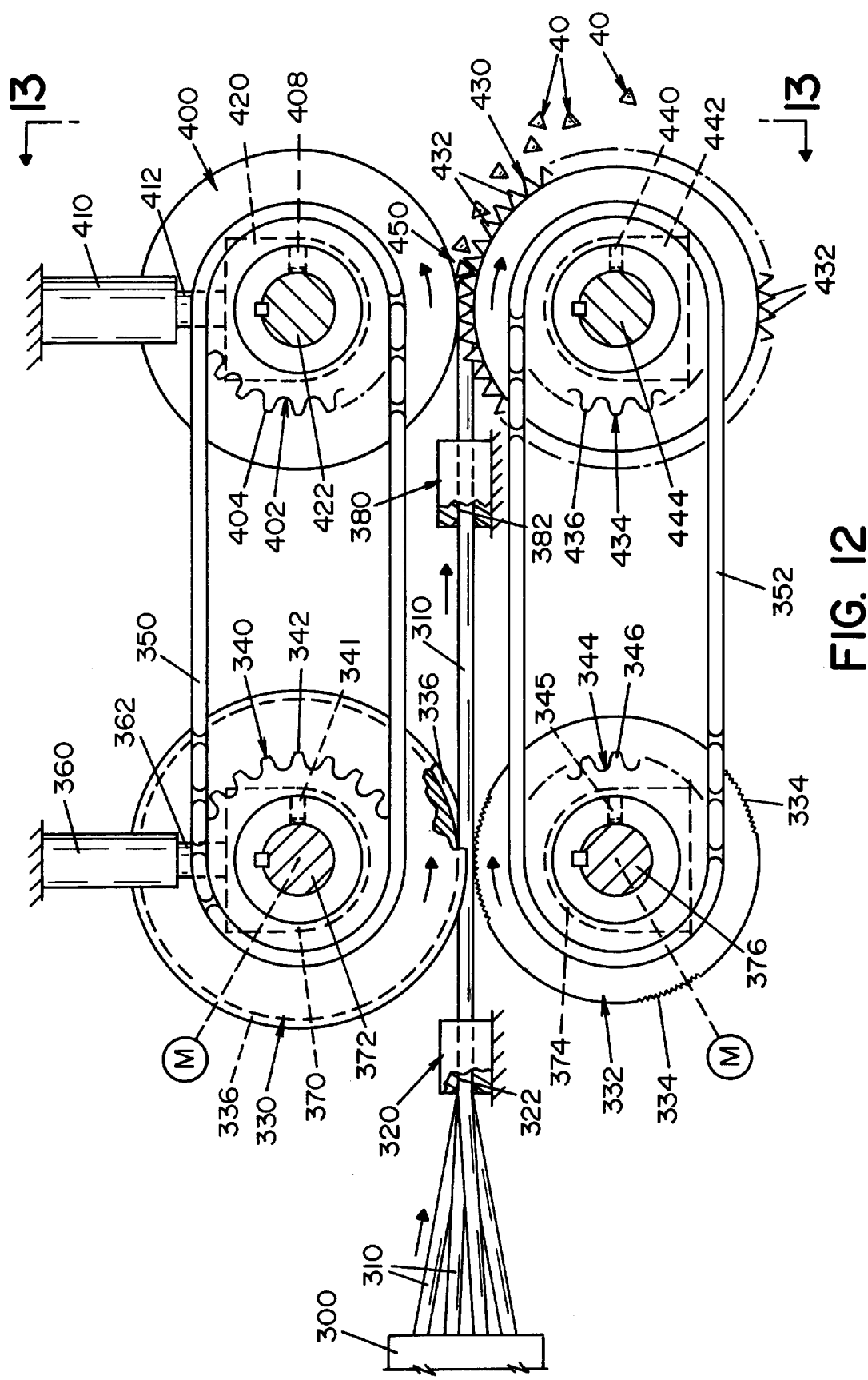
FIG. 12 is a side view schematically illustrating the extruder and a cutter for producing pellets of feed material of FIGS. 3 and 8.

Referring now to FIGS. 12 and 13, a cutting apparatus for forming triangular, trapezoidal or semi-trapezoidal shaped pellets is shown. As shown in FIG. 12, a plurality of cylindrically shaped metal columns 310 are extruded through a plurality of openings in extruder 300. The size of the openings in extruder 300 determines the cross-sectional diameter of the metal columns. A variety of different opening sizes can be used. The plurality of metal columns 310 are directed through a plurality of openings 322 in column guide 320. Column guide 320 orients metal columns 310 in substantially the same plane as shown in FIG. 12.

The metal columns are then drawn through a feeder. The feeder includes two drive wheels 330, 332 which are rotated at a substantially constant speed in the direction shown by the arrows. The drive wheels are illustrated as being substantially the same size, thus are rotated at substantially the same speed. Drive wheel 332 mounted on axle 376 is rotatably mounted on axle base 374. A set screw (not shown) connects the drive wheel 332 to axle 376. Axle base 374 is mounted in place thereby maintaining drive wheel 332 is a substantially constant position. Drive wheel 330 mounted on axle 372 is rotatably mounted on axle base 370. A set screw (not shown) connects the drive wheel 330 to axle 372. The axle base is mounted to a movable piston 362 which is connected to a piston column 360. Movable piston 362 causes drive wheel 330 to be driven downwardly toward drive wheel 332 thereby producing the needed friction between the drive wheels so that columns 310 are drawn through the drive wheels. Piston 362 is typically forced downwardly by air pressure and/or by a spring. Drive wheel 330 includes guide groove 336. Each guide groove is designed to receive a single metal column of extruded metal. Drive wheel 332 includes a plurality of teeth 334 that are designed to engage and draw metal columns 310 through drive wheels 330, 332. Synchronizing wheels 340, 344 are connected to each axle 372, 376. Each synchronizing wheel 340, 344 includes sprockets 342, 346 which are designed to engage chains 350, 352. Synchronizing wheels 340, 344 are connected to axle 372, 376 by set screws 341, 345. Synchronizing wheels 340, 344 are illustrated as being substantially the same size. Motors M cause drive wheels 330, 332 and synchronizing wheels 340, 344 to rotate at substantially the same speed and in the direction of the arrows.

After the metal columns 310 are drawn through drive wheels 330, 332, the columns of metal are directed into openings 382 of secondary guide 380. Secondary guide 380 guides metal columns 310 toward cutting wheels 400, 430 and facilitates in holding the metal columns in place during cutting. Similar to the drive wheels, cutting wheels 400, 430 are mounted on axles 422, 444 and rotatably mounted on axle bases 420, 442. Set screws 406, 438 connect the cutting wheels to their respective axles. Axle base 442 is mounted in place thereby maintaining cutting wheel 430 is a substantially constant position. Axle base 420 for cutting blade 400 is mounted to a movable piston 412 which is connected to a piston column 410. Movable piston 412 causes cutting wheel 400 to be driven downwardly toward cutting wheel 430 thereby ensuring a proper cut of the metal columns to form the pellets. Typically, piston 412 is forced downwardly by air pressure and/or by a spring. Cutting wheel 400 is shown to have a substantially flat surface; however, shallow grooves can be includes on the face of cutting wheel 400. Cutting wheel 430 includes a plurality of teeth 432 that are designed to cut metal columns 310 to form the desired shaped pellets 40. The surface angles of the cutting teeth are typically about 40–75° and preferably about 60°. Synchronizing wheels 402, 434 are connected to axles 422, 444. Each synchronizing wheel includes sprockets 404, 436 which are designed to engage chains 350, 352. Synchronizing wheels 402, 434 are connected to axles 422, 444 by set screws 408, 440. Cutting wheels 400 and 430 are illustrated as being substantially the same size, thus they rotate at substantially the same speed. Synchronizing wheels 340, 344 are shown to be substantially the same size as synchronizing wheels 402, 434. In such as configuration, the drive wheels and the cutting wheels rotate at substantially the same speed. In such a configuration, the synchronizing wheels for the drive wheels and the synchronizing wheels for the cutting wheels are substantially the same size so that the drive wheels rotate at substantially the same speed and the cutting wheels rotate at substantially the same speed. As can be appreciated, the drive wheels and/or the cutting wheels can be designed to rotate at different speeds.

As shown in FIG. 12, the configuration of the cutting teeth 432 on cutting wheel 430 determines the final shape of the pellets. Four different cutting teeth configurations are illustrated in FIG. 13. The first cutting wheel has a cutting teeth configuration 450 which forms pellets having a triangular shaped side profile similar to pellets 40 of FIGS. 3–7. The second cutting wheel has a cutting teeth configuration 452 which forms pellets 460 having a trapezoidal side profile. The diameter of pellets 460 is smaller than the pellets formed by the first cutting wheel. The third cutting wheel has a cutting teeth configuration 454 which forms pellets 470 having a semi-trapezoidal side profile as the pellets shown in FIGS. 8–10. The diameter of pellets 470 is larger than the pellets formed by the second cutting wheel. The fourth cutting wheel has a cutting teeth configuration 456 which forms pellet 480 having a trapezoidal side profile which is slightly different from the trapezoidal side profile formed by the second and third cutting wheels. The diameter of pellets 480 is smaller than the pellets formed by the second and third wheels.

In accordance with another aspect of the invention, a thixotropic alloy is produced by heating and shearing pellets of the feed material to produce a mixture of solid particles within a liquid matrix. Preferably, the thixotropic condition is produced through the use of a screw extruder into which the pellets of feed material are supplied to enter a first heating zone in which they are heated to a temperature above the liquidus temperature of the alloy or composite. The molten metal then passes to a second zone in the extruder wherein the molten metal is cooled to a temperature below the liquidus temperature and above the solidus temperature of the material, whereby solidification of some of the material occurs to form a mixture of solid particles and liquid. The extruder screw is rotated, whereby the mixture is sheared to prevent the formation of large crystal structures and to form a thixotropic material. Alternatively, the pelletized feed material may be heated in the first zone of the extruder to a temperature above the solidus temperature but below the liquidus temperature of the material, whereupon the screw is rotated to shear the resulting mixture of liquid and solid particles to produce a thixotropic material. While it is preferred to use a screw extruder in connection with the foregoing process for producing a thixotropic material, it will be appreciated that other apparatus capable of heating the pellets of feed material to the required temperature and supplying the necessary shearing force to the mixture of liquid and solid particles can be used.

The thixotropic material formed by the foregoing methods is particularly suited for use in the production of metal parts by injection molding. Accordingly, and in accordance with a further aspect of the invention, a method is provided for producing a metal part or article which comprises injecting the sheared mixture of solid particles and liquid into an article mold and allowing the mixture to at least partially solidify therein before removing the article from the mold.

While considerable emphasis has been placed herein on the preferred embodiments of the invention, it will be appreciated that other embodiments can be made and that many changes can be made in the embodiments disclosed herein without departing from the principles of the invention. Accordingly, it is to be distinctly understood that the foregoing descriptive matter is to be interpreted merely as illustrative of the invention and not as a limitation, and it is intended to include all such modifications and alterations insofar as they come within the scope of the present invention.

Having thus described the invention, I claim:

1. A method of producing feed material for use in producing a thixotropic alloy comprising introducing extrusion stock material of a metal alloy or composite into extruding apparatus, heating the stock material to an extrusion temperature therefor, extruding the stock material to form an extruded stock material having a substantially uniform cross-sectional shape along a longitudinal axis of said extruded stock material, and severing lengths of the extruded stock material to produce solid pellets of feed material having substantially the same shape and size and having a maximum length to maximum thickness ratio of about 0.8 to 4:1, said pellets having a substantially circular cross-sectional shape and a side profile selected from the group consisting of a substantially triangular shaped, a substantially trapezoidal side profile, and a semi-trapezoidal side profile, at least one end of said pellet having an angle of slope of about 5–75°.

2. The method according to claim 1, including the step of forming a thixotropic alloy by heating said pellets and shearing the pellets to produce a mixture of solid particles within a liquid matrix.

3. The method according to claim 2, wherein said heating comprises heating said pellets in an extruder apparatus to a temperature above the solidus temperature, and wherein said shearing prevents the formation of large crystal structures in said mixture.

4. The method according to claim 3, wherein said pellets are heated to a temperature below the liquidus temperature of the feed material.

5. The method according to claim 2, wherein said heating comprises heating said pellets in a first zone in said extruder apparatus to a temperature above the liquidus temperature of said feed material to produce a substantially molten feed material, and cooling the substantially molten feed material in a second zone of said extruder apparatus to a temperature below the liquidus temperature but above the solidus temperature of the feed material.

6. The method according to claim 2, wherein said heating and shearing includes the use of a screw extruder apparatus.

7. The method according to claim 5, wherein said heating and shearing includes the use of a screw extruder apparatus includes the use of a screw extruder in said second zone to prevent the formation of large crystal structures in the molten feed material.

8. The method according to claim 2, wherein said heating and shearing causing the formation of a mixture of solids and liquid, injecting said mixture of solids and liquid into a mold, and at least partially solidifying said mixture in the mold to produce an article, and removing the article from said mold.

9. The method according to claim 1, wherein said ratio is about 1.11 to 2.5:1.

10. The method according to claim 9, wherein the maximum thickness of the pellets of feed material is about 0.05 to 0.4 inch.

11. The method according to claim 10, wherein the maximum length of the pellets is about 0.1 to 0.5 inch.

12. The method according to claim 11, wherein said metal alloy or composite includes a metal selected from the group consisting of magnesium, magnesium alloy, or mixtures thereof.

13. The method according to claim 12, including the step of cutting said extruded stock material by a continuously rotating cutting wheel, said cutting wheel having a plurality of cutting blades.

14. The method as defined in claim 13, wherein said cutting wheel forming pellets having a substantially circular cross-sectional shape and a substantially triangular shaped side profile, each end of said pellet having an angle of slope of about 5–75°.

15. The method according to claim 12, including the step of cutting said extruded stock material by a continuously rotating blade, said rotating blade having a plurality of cutting tools.

16. The method according to claim 12, including the step of cutting said extruded stock material by a shearing blade that moves in a substantially single plane.

17. The method according to claim 12, including the step of cutting said extruded stock material by a continuously rotating cutting wheel, said cutting wheel having a plurality of teeth.

18. The method according to claim 1, wherein the maximum thickness of the pellets of feed material is about 0.05 to 0.4 inch.

19. The method according to claim 1, wherein the maximum length of the pellets is about 0.1 to 0.5 inch.

20. The method according to claim 1, wherein said metal alloy or composite includes a metal selected from the group consisting of magnesium, magnesium alloy, or mixtures thereof.

21. The method according to claim 1, including the step of cutting said extruded stock material by a continuously rotating cutting wheel, said cutting wheel having a plurality of cutting blades.

22. The method as defined in claim 21, wherein said cutting wheel forming pellets having a substantially circular cross-sectional shape and a substantially triangular shaped side profile, each end of said pellet having an angle of slope of about 5–75°.

23. The method according to claim 1, including the step of cutting said extruded stock material by a continuously rotating blade, said rotating blade having a plurality of cutting tools.

24. The method according to claim 1, including the step of cutting said extruded stock material by a shearing blade that moves in a substantially single plane.

25. The method according to claim 1, including the step of cutting said extruded stock material by a continuously rotating cutting wheel, said cutting wheel having a plurality of teeth.

* * * * *